United States Patent [19]
Wasserman

[11] Patent Number: 5,559,929
[45] Date of Patent: Sep. 24, 1996

[54] METHOD OF ENHANCING THE SELECTION OF A TRAINING SET FOR USE IN TRAINING OF A NEURAL NETWORK

[75] Inventor: Philip D. Wasserman, Cupertino, Calif.

[73] Assignee: Unisys Corporation, Blue Bell, Pa.

[21] Appl. No.: 282,250

[22] Filed: Jul. 29, 1994

[51] Int. Cl.$^6$ .................................................. G06F 7/00
[52] U.S. Cl. ......................... 395/23; 395/22; 395/24
[58] Field of Search ................................... 395/23, 24, 22

[56] References Cited

U.S. PATENT DOCUMENTS

| | | | |
|---|---|---|---|
| 4,782,460 | 11/1988 | Spencer | 395/24 |
| 4,875,183 | 10/1989 | Graf et al. | 395/24 |
| 4,885,757 | 12/1989 | Provence | 395/24 |
| 5,255,362 | 10/1993 | Brandstetter et al. | 395/25 |

OTHER PUBLICATIONS

Zhang et al, "Error Back Propagation with Minimum–Entropy Weights", IEEE Int. Conf. on Neural Networks, 1991.
Lee et al, "An Efficient Hidden Node Reduction Technique for Multilayer Perceptrons" IEEE Int. Conf. on Neural Networks, 1991.
Hergert et al, "A Comparison of Weight Elimination Methods for Reduction Complexity in Neural Networks", IEEE Int. Conf. on Neural Networks, 1992.
Hassibi et al, "Optimal Brain Surgeon and General Network Pruning" IEEE Int. Conf. on Neural Network, 1993.
Reed et al, "Pruning Algorithm—A Survey", IEEE Transactions on Neural Networks, vol. 4, No. 5, Sep. 1993.
Specht et al, "A General Regression Neural Network" IEEE Transactions on Neural Networks, vol. 2, No. 6, Nov. 1991.
Sietsma et al, "Neural Net Pruning—Why and How", IEEE Int. Conf. on Neural Networks, 1988.
Martinez et al, "A Simple Strategy for Building and Training Multi–layer Neural Networks" IEEE Int. Conf. on Neural Networks, 1991.
Jiang et al, "Compact Polynomial Modeling of the Multi–layer Perceptron", 26th Asilomar Conf. on Signals, System & Computers, 1992.
Yang et al, "A Convenient Method to Prune Multilayer Neural Networks via Transform Domain Backpropagation Algorithm", IEEE Int. Conf. on Neural Networks, 1992.

*Primary Examiner*—George B. Davis
*Attorney, Agent, or Firm*—Nathan Cass; Mark T. Starr

[57] ABSTRACT

A method for enhancing the performance of an artificially intelligent system employing a neural network by proving an optimized training set for training the neural network. The optimized training set is produced by identifying and permanently removing inaccurate training pairs in the training set. The permanent removal of inaccurate training pairs is performed in a worst-error order.

9 Claims, 10 Drawing Sheets

METHOD OF ENHANCING THE SELECTION OF A TRAINING SET FOR USE IN TRAINING OF A NEURAL NETWORK

RELATED U.S. PATENT APPLICATION

This patent application contains subject matter related to my copending patent application Ser. No. 08/279,365, filed Jul. 22, 1994, for METHOD OF ENHANCING THE PERFORMANCE OF A NEURAL NETWORK.

BACKGROUND OF THE INVENTION

1. Field of the Invention

The present invention generally relates to methods for enhancing the performance of artificially intelligent systems (AIS) employing artificial neural networks. More specifically, the present invention relates to a method for providing a more accurate training set for an AIS, whereby the performance of the AIS is enhanced.

2. Description of the Prior Art

Artificially intelligent systems employing artificial neural networks are now widely used in both military and industrial applications. Typical applications include pattern classification, pattern completion, function approximation, optimization, prediction, and automatic control. Artificial neural networks are patterned after the intricate and sophisticated neural system of the human brain and are thereby able to mimic human intelligence. A neural network thus makes available a powerful additional approach for problem solving having capabilities which are not available using other more conventional approaches.

Basically, all artificial neural networks perform essentially the same function. They accept a set of inputs and produce a corresponding set of outputs, an operation called vector mapping. Likewise, all neural network applications are special cases of vector mapping.

Figure 1:
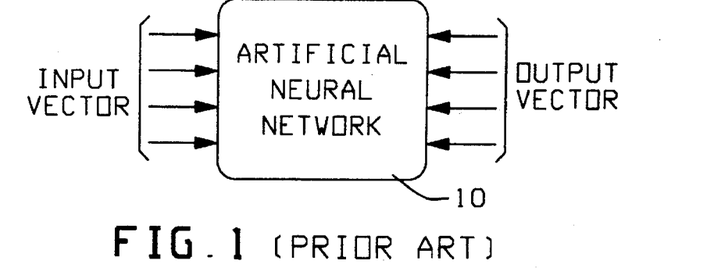
FIG. 1 is a general view of a neural network as a vector mapper.
Figure 2:
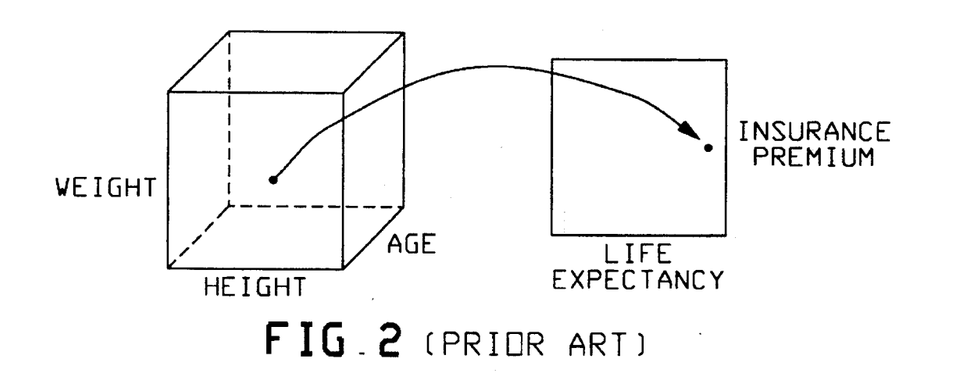
FIG. 2 schematically illustrates a neural network system which maps a three-component input vector into an output vector with two components.

FIG. 1 illustrates a general view of a neural network as a vector mapper. As shown, an artificial neural network 10 accepts a set of inputs (an input vector) and produces a set of outputs according to some mapping relationship encoded in its structure. For example, FIG. 2 shows a system that maps an input vector with three components—height, weight, and age, into an output vector with two components—life expectancy and insurance premium.

Figure 3:
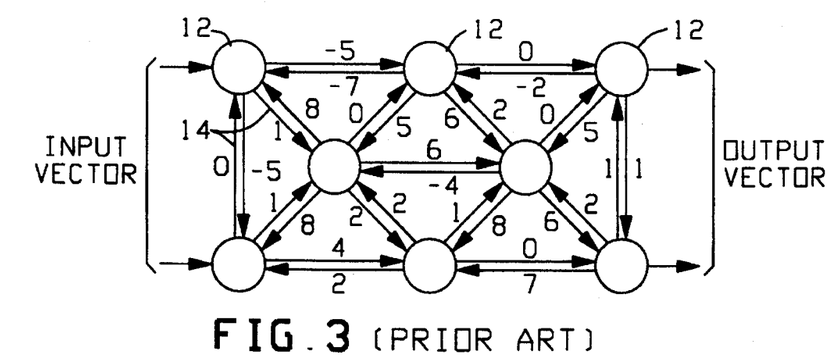
FIG. 3 schematically illustrates a neural network configuration wherein the mapping relationship between input and output is defined by weighing values which scale the inputs to processing units (shown as circles).
Figure 4:
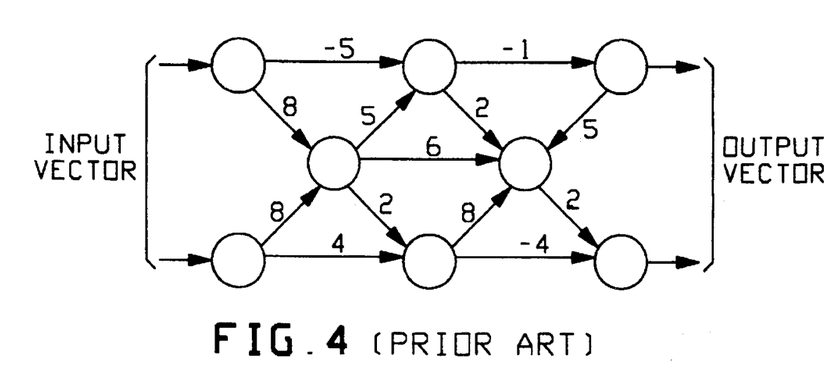
FIG. 4 schematically illustrates a feed-forward neural network wherein signals flow only from input to output.

The nature of the mapping relationship between input and output vectors is defined by the values of free variables (often called weights) within the network. FIG. 3 shows a configuration where weights (the numbers on the interconnecting lines 14) scale the inputs to processing units 12 (circles). FIG. 4 shows a special case, the feed-forward network, in which the signals flow only from input to output. The mapping relationship between input and output vectors may be static, where each application of a given input vector always produces the same output vector, or it may be a dynamic, where the output produced depends upon previous, as well as current, inputs and/or outputs. Since feed-forward networks have no memory, they are only capable of implementing static mappings. Adding feedback allows the network to produce dynamic mappings.

Artificial neural networks learn from experience. This characteristic, perhaps more than any other, has created the current interest in these methods. In addition to the anthropomorphic implications (that are usually inappropriate), learning offers a powerful alternative to programming. Learning methods may be broadly grouped as supervised and unsupervised with a great many paradigms implementing each method.

In supervised learning, the network is trained on a training set consisting of vector pairs. One vector is applied to the input of the network; the other is used as a "target" representing the desired output. Training is accomplished by adjusting the network weights so as to minimize the difference between the desired and actual network outputs. The network is trained by applying each input vector and adjusting the network weights in a direction that minimizes the error between the network output and the desired output vector. This process may be an iterative procedure, or weights may be calculated by closed-form equations.

In iterative training, application of an input vector causes the network to produce an output vector. This is compared to the target vector, thereby producing an error signal which is then used to modify the network weights. This weight correction may be general, equally applied as a reinforcement to all parts of the network, or it may be specific, with each weight receiving an appropriate adjustment. In either case the weight adjustment is intended to be in a direction that reduces the difference between the output and target vectors. Vectors from the training set are applied to the network repeatedly until the error is at an acceptably low value. If the training process is successful, the network is capable of performing the desired mapping.

Unsupervised learning (sometimes called self-organization) requires only input vectors to train the network. During the training process the network weights are adjusted so that similar inputs produce similar outputs. This is accomplished by the training algorithm that extracts statistical regularities from the training set, representing them as the values of network weights.

Classification is a special case of vector mapping and has an extremely broad range of applications. Here, the network operates to assign each input vector to a category. For example, an input vector might represent the values of the leading economic indicators on a specific date; the two classes might be "Dow Jones Up" and "Dow Jones Down" on the following day.

Classification is a central concern in the study of artificial intelligence. An efficient and effective replication of the human's ability to classify patterns would open the door to a host of important applications. These include interpretation of handwriting, connected speech, and visual images. Unfortunately, this goal has been elusive. In most cases humans still perform these tasks far better than any machine devised to date.

The classification decision is based both upon measurements of the object's characteristics and upon a data base containing information about the characteristics and classifications of similar objects. Therefore, implicit in this process is the collection of data that characterize the statistical properties of the objects being classified.

For example, a lumber mill might wish to automatically separate pieces of pine, spruce, oak, and redwood, putting them into separate bins. This classification could be accomplished by making a set of measurements on the piece, such as color, density, hardness, etc. This set of measurements, expressed numerically, forms a feature vector for that piece, where each measurement is a vector component. The feature vector is compared with a set of recorded feature vectors and their known classifications, those comprising a training set. By some method, a decision is made regarding the correct classification.

The ability to successfully train an artificial neural network is of vital importance to its successful utilization in a practical application. A key event in the history of artificial neural networks was the development in 1982 of a feed-forward network trained by back-propagation. For the first time a theoretically sound technique was available to train multilayer, feed-forward networks with nonlinear neurons. The power and generality of such networks was known for many years, but prior to backpropagation there was no efficient, theoretically sound method for training their weights.

Today, backpropagation (or one of its many variations) is by far the most commonly applied neural network training method. Unfortunately, backpropagation is a mixed blessing, exhibiting a number of serious problems while training. For example, the user is required to select three arbitrary coefficients: training rate, momentum, and the range of the random weight initialization. There is little theory to guide their determination. An unfortunate choice can cause slow convergence or network paralysis where learning virtually stops. Paralysis usually requires a complete retraining, thereby losing all benefit from what may have been days of computation. Also, due to the minimum error seeking nature of the algorithm, the network can become trapped in a local minimum of the error function, arriving at an unacceptable solution when a much better one exists.

While these problems are serious, perhaps backpropagation's most onerous characteristic is its long training time. Training sessions of days, even weeks, are common; this is not merely an inconvenience. While in theory training need only be done once, system development inevitably requires a certain amount of iterative optimization, particularly when developing features from the data set. This means that the backpropagation network must often be trained many times. In most practical applications this imposes long waiting periods in the development process. Given the tight schedules which seem characteristic of today's projects, promising alternatives may go unexplored, parameter optimization may be prematurely terminated, and non-optimal results are often produced. Although attempts have been made to devise heuristics to increase training speed, the results are highly problem dependent, and prediction of effectiveness is difficult. Nevertheless, with all of these problems, back-propagation remains a highly effective paradigm.

Figure 5:
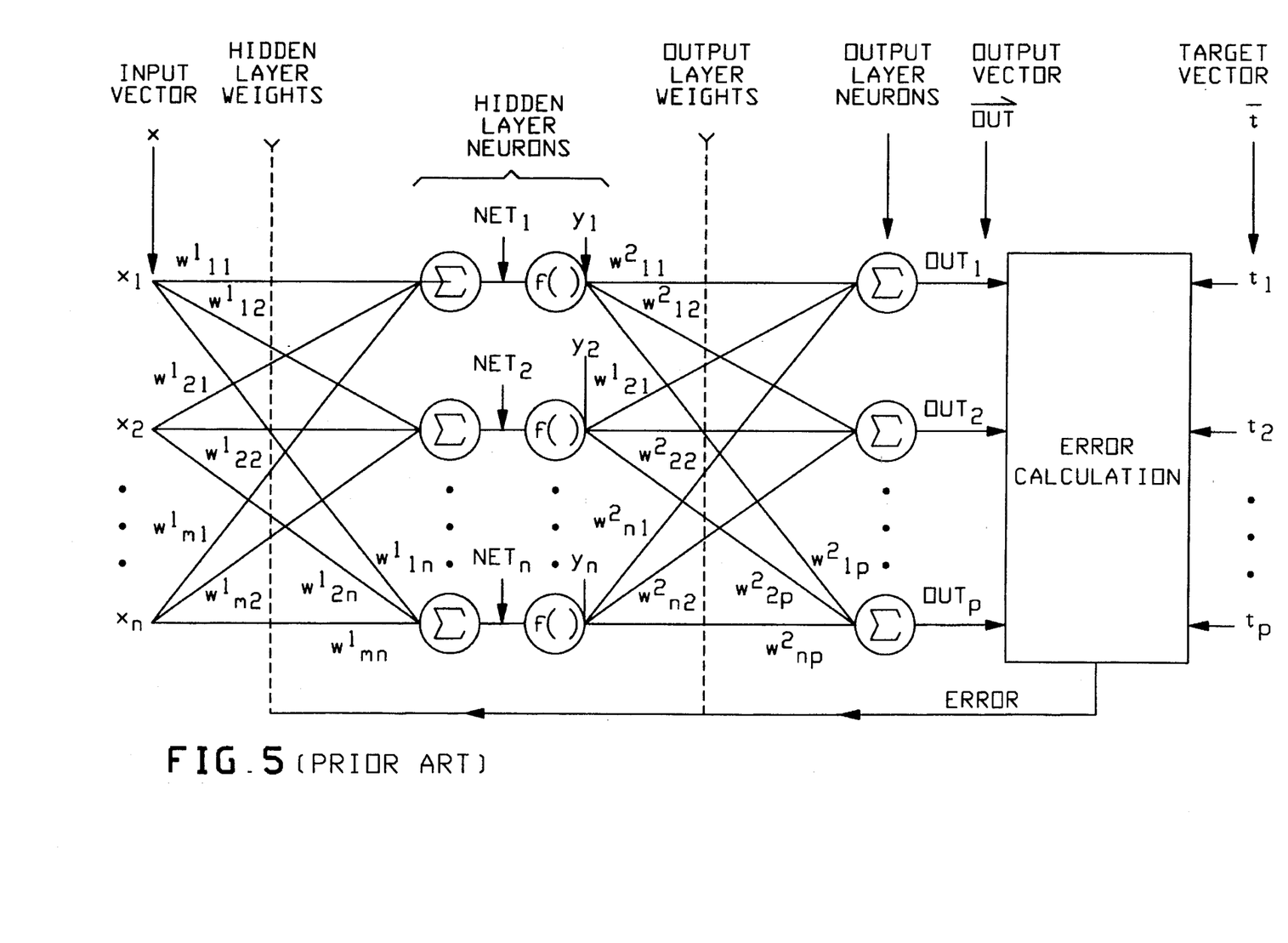
FIG. 5 schematically illustrates a feed-forward network with a single nonlinear hidden layer and a linear output layer which is able to approximate any continuous function.

FIG. 5 is an example of a feed-forward network with a single nonlinear hidden layer and a linear output layer, wherein backpropagation is used for training. While there are many elaborations, such as adding more layers, or making the output layer nonlinear, this configuration is adequate to approximate any continuous function.

In operation, a set of inputs, $x_1, x_x, \ldots x_m$ is applied to the network. It is useful to think of these as comprising an input vector X. The network performs calculations on this vector producing a set of outputs, $out_1, out_2, \ldots out_p$, collectively referred to as the output vector "out".

In the first layer, the input row vector X is multiplied by weight matrix $W^1$, thereby accomplishing the multiplication and summation indicated in FIG. 5. The product produces a vector called net. Each component of net is then operated on by nonlinear function f(), thereby producing the vector y. Thus, $$y=f(XW^1)$$

where X and y are row vectors; each column of $W^1$ contains the weights associated with a single hidden layer neuron, and f() operates on the product in a component-by-component fashion f() is often the sigmoidal logistic function:

$$y=1/(1+e^{-\beta net})$$

Large values of $\beta$ produce a steep function approaching a step, whereas small values produce a smoother function. $\beta$ will be assumed to be 1.0. The range of the logistic function is 0.0 to 1.0. Since it bounds the neurons output between these values, it is often called a squashing function. Often the function's range is offset by subtracting 0.5, a change that makes training somewhat faster. The logistic function has an important computational advantage in that its derivative (which is used during training) has the simple form:

$$f(net) [1-f(net)]$$

The hyperbolic tangent is another commonly used squashing function having a range from −1.0 to +1.0:

$$y=\tanh (net)$$

Many other squashing functions may be used. The choice does not seem to be critical as long as the function is nonlinear and bounds the neuron's output.

The output layer in FIG. 5 multiplies vector by weight matrix $W^2$ producing output vector "out". Hence, $$out=f(xW^1)W^2$$

Since supervised training is used in backpropagation, a training set is required consisting of vector training pairs. Each training pair is composed of an input vector x and a target vector t. The target vector represents the set of values desired from the network when the input vector x is applied.

Before training, the network weights are initialized to small, random numbers. The optimal range of these numbers is problem dependent, however, it is safest to start with a range around ±0.1. While larger values can accelerate convergence on some problems, they can also lead to network paralysis.

The object of training is to adjust the weight matrices so that the network's actual output is more like the desired output. More formally, the algorithm minimizes an error measure between the output vector and target vector. This error measure is computed and the weight adjusted for each training pair. While many error measures are possible, in this case the error measure used is:

$$sse = \sum_i [(t^i - out^i)^2]$$

where i is the number of components in the output vector.

Alternatively, the error may be averaged over all vector pairs in the training set, in which case the error measure is:

$$1/n \sum_n \sum_i [(t^i - out^i)^2]$$

where n is the number of training vectors in the training set.

Figure 6:
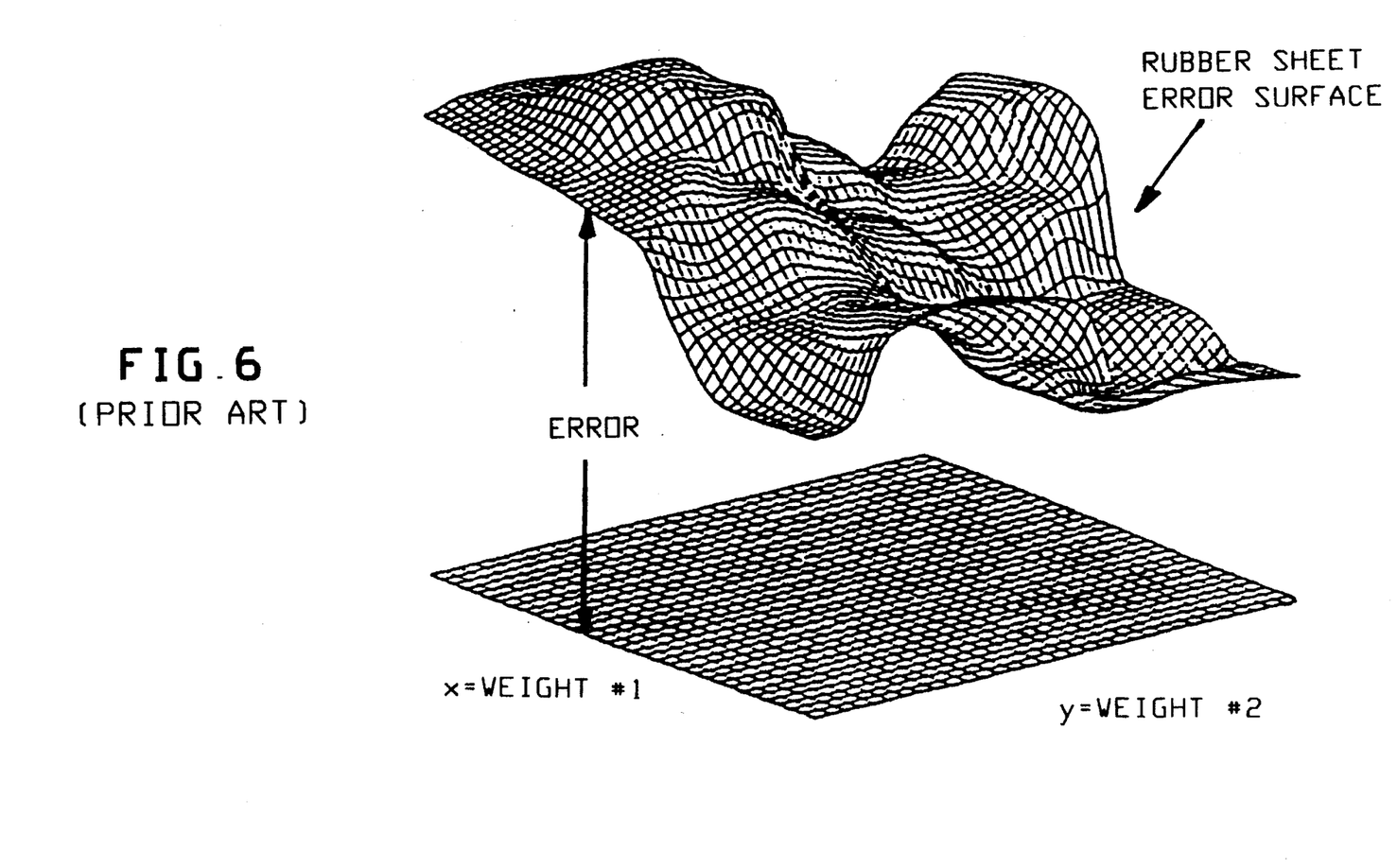
FIG. 6 provides a graphical visualization of errors occurring between the output and input of a neural network.

If only two weights in a network are considered, their values can be thought of as defining the x-y coordinates of a point on a table top. Visualization breaks down if more weights are involved. As shown in FIG. 6, the error may be visualized as a rubber sheet hovering above that surface, where the height of the sheet at each point is determined by the error at that x-y position. The rubber sheet represents the error surface. With more weights, the rubber sheet image is still useful, but its height at every point on the sheet is now a function of more variables.

The backpropagation training algorithm uses gradient descent, a multi-dimensional optimization method used for hundreds of years. In essence, the method changes each weight in a direction that minimizes the error. This change may be done at the time each input vector is applied, or, changes may be averaged and weights changed after all input vectors have been seen. In either case, many passes through the training set may be required to reduce the error to an acceptable value.

Probabilistic neural networks, a direct outgrowth of earlier work with Bayesian classifiers, represents another prior art approach for artificial neural networks. This approach uses supervised training, is nonrecursive, and unlike back-propagation, provides for rapid training. However, a practical difficulty lies in its use of the entire training set for each classification. This increases storage requirements and lengthens classification times. Various clustering techniques have been developed that reduce the size of the training set. However, with memory prices dropping rapidly, this is not the problem that it once was. Nevertheless, classification times can become much longer than for feed-forward networks if the training set is large.

Another prior art neural network approach which provides for rapid training uses radial basis-function neural networks. Closely related to these networks is a general regression neural network (GRNN) which has the particular advantage of not requiring any training at all. Unfortunately, these networks require all, or a substantial portion, of the training set to be involved in their operation. As a result, after training, these networks are slower to use, requiring more computation to perform a classification or function approximation.

Considering GRNN in more detail, it will be understood that GRNN is based on nonlinear regression theory, a well-established statistical technique for function estimation. By definition, the regression of a dependent variable y on an independent variable x estimates the most probable value for y, given x and a training set. The training set consists of values for x, each with a corresponding value for y (x and y are, in general, vectors). Note that y may be corrupted by additive noise. Despite this the regression method will produce the estimated value of y which minimizes the mean-squared error.

GRNN is based upon the following formula from statistics:

$$E[y|x] = \frac{\int_{-\infty}^{\infty} yf(x,y)dy}{\int_{-\infty}^{\infty} yf(x,y)dy}$$

Where:
y=output of the estimator

X=the estimator input vector

E(y/x)=the expected value of out, given the input vector X f(x,y)=the joint probability density function (pdf) of X and y GRNN is, in essence, a method for estimating f(X,y), given only a training set. Because the pdf is derived from the data with no preconceptions about its form, the system is perfectly general. There is no problem if the functions are composed of multiple disjoint non-Gaussian regions in any number of dimensions, as well as those of simpler distributions.

The function value $y_j$ for the GRNN is estimated optimally as follows:

$$y_j = \sum_{i=1}^{n} h_i w_{ij} / \sum_{i=1}^{n} h_i$$

where:

$W_{ij}$=the target (desired) output corresponding to input training vector $x_i$ and output j $h_i$=exp $[-D_i^2/(2\sigma^2)]$, the output of a hidden layer neuron $D_i^2=(x-u_i)^T(x-u_i)$ (the squared distance between the input vector x and the training vector u)

x=the input vector (a column vector)

$u_i$=training vector i, the center of neuron i (a column vector)

σ=a constant controlling the size of the receptive region.

Figure 7:
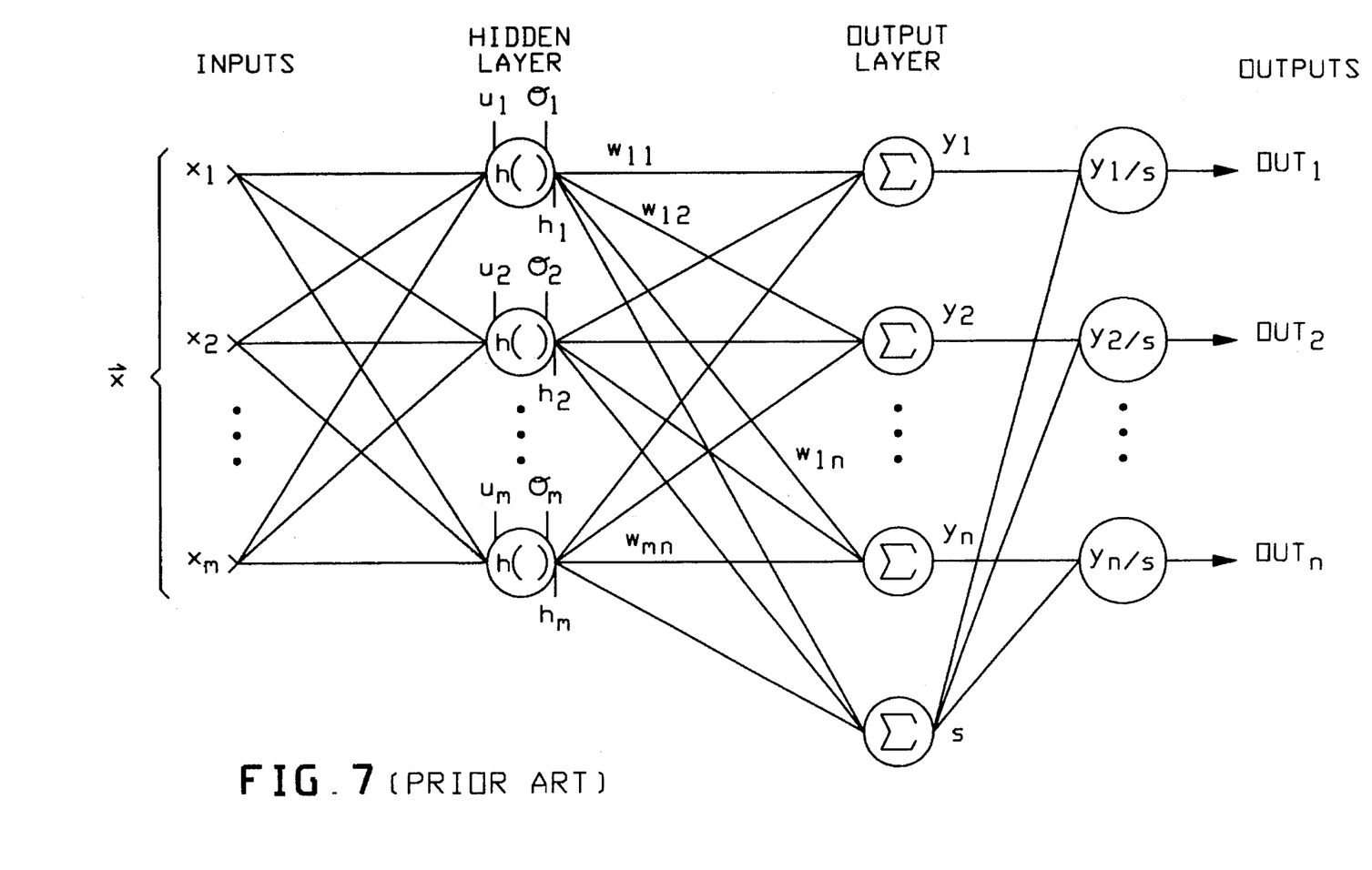
FIG. 7 schematically illustrates a general regression neural network (GRNN).

FIG. 7 shows the general form of a GRNN. In GRNN, instead of training the weights, one simply assigns to $w_{ij}$ the target value directly from the training set associated with input training vector i and component j of its corresponding output vector. Consider a single pair of vectors in the training set, one an input vector and the other a target vector. A hidden layer neuron is created to hold the input vector. For simplicity, assume that the target vector has only one component and the network has only one output neuron. The weight between the newly created hidden neuron and the output neuron is assigned the target value. If there is more than one output neuron, the weight from the hidden neuron to each is given the corresponding target value.

As a concrete example of GRNN training, suppose that the training set contains the following training pair:

Input Vector: 1 2 5 3

Target Vector: 3 2

Figure 8:
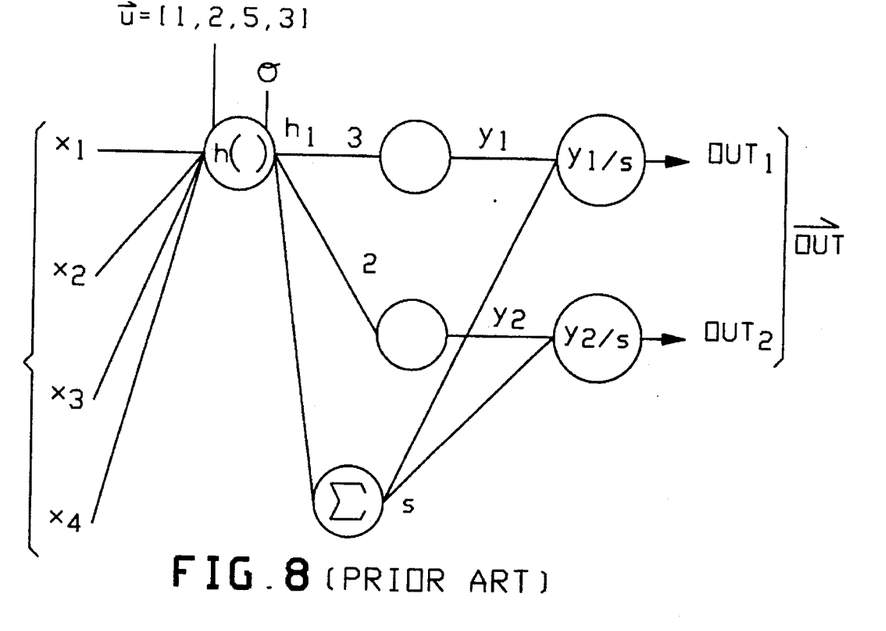
FIG. 8 schematically illustrates an example of a GRNN.

As shown in FIG. 8, a hidden layer neuron is created to hold the input vector. Two weights go from this neuron to output neurons. These weights $u_1$ and $y_2$ have values 3 and 2, respectively, corresponding to the target vector.

Figure 9:
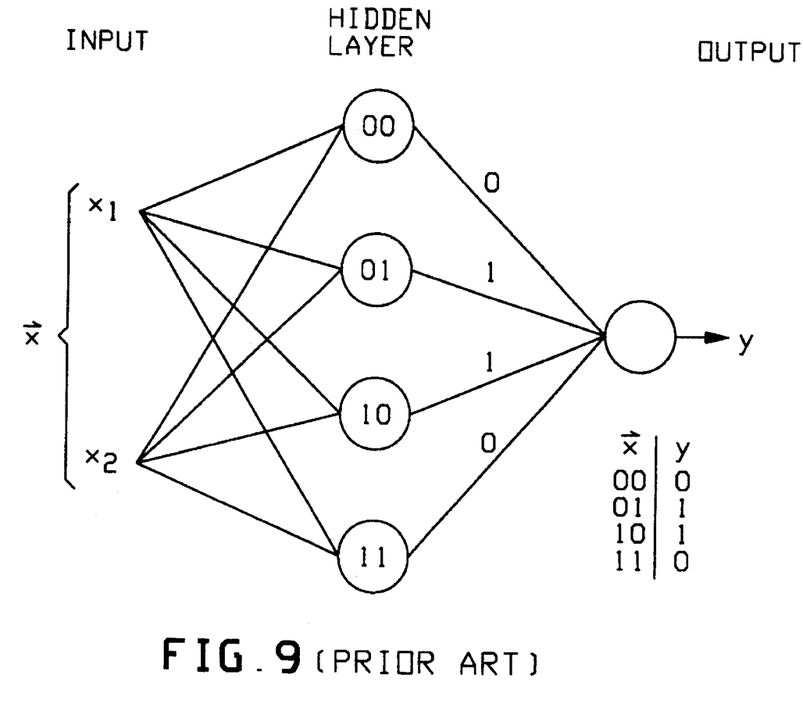
FIG. 9 schematically illustrates another example of a GRNN.

As another GRNN example, FIG. 9 shows a network designed by this method which solves the celebrated exclusive-or problem. The values of σ are chosen to be small; for a given input one and only one hidden layer output is 1, the rest are nearly). Clearly, if the weights of the hidden layer neuron equal the input vector x, the distance between them will be zero and the above equation for $y_j$ will evaluate to 1. The small value of σ causes the rest to be arbitrarily close to 0, thereby solving the problem.

Since GRNN can approximate any continuous function, it can easily be made into a classifier. A classifier has binary target vectors, each of which has a single one indicating the target class. All other components are zero; the GRNN network used as a classifier will have its output layer weights set to ones and zeros. Classification then consists of applying an input vector and determining which output is greatest.

Each GRNN hidden neuron represents an input training vector, and each has that vector's classification as well as its weights. The following procedure (a specialization of the general method described above) is used to set the weights of a GRNN classifier.

For each hidden neuron:

1. Assign the weight going to the output neuron of the same class the value 1.

2. Assign weights going to all other output neurons the value 0. These will have no effect upon the output neurons: therefore, the weight can be removed from the network.

Figure 10:
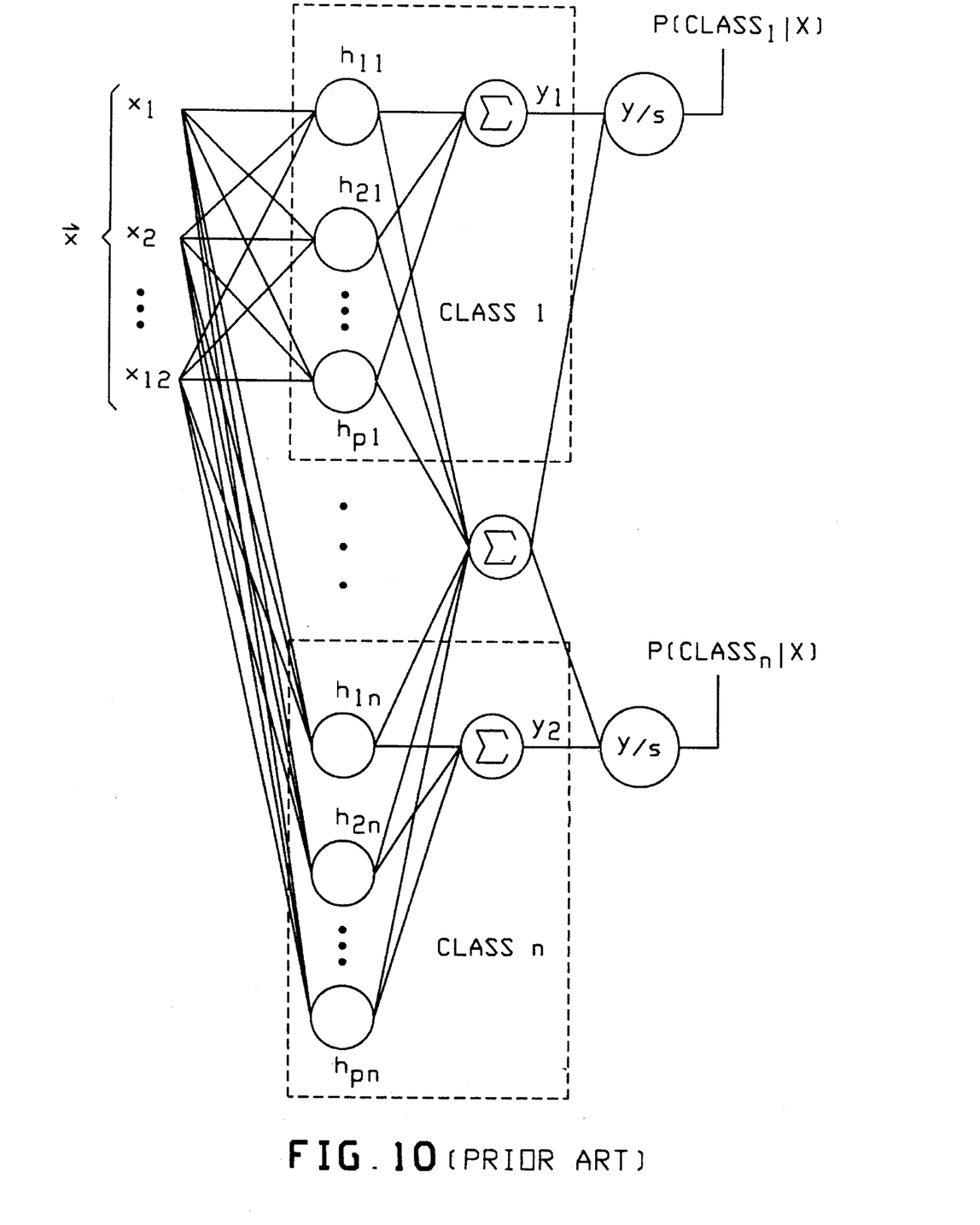
FIG. 10 schematically illustrates a further example of a GRNN.

Performing the above operations on the GRNN produces the network of FIG. 10.

The above discussion sets forth various prior art information regarding AIS and artificial neural networks. Additional information can be obtained from the book "Advanced Methods in Neural Computing", by Philip D. Wasserman, Van Nostrand Reinhold, New York, N.Y. 1993. More detailed information as to GRNN can be obtained from the article "A General Regression Neural Network", by Donald F. Specht, IEEE TRANSACTIONS ON NEURAL NETWORKS, Vol. 2, No. 6, November 1991, pp. 568–576.

SUMMARY OF THE INVENTION

It will be evident from the foregoing that various types of neural networks and associated training methods are known in the art. However, no matter how well these networks are capable of performing, their actual performance is critically dependent on the integrity of the examples which are used for training the neural network.

In my aforementioned copending application a particularly advantageous method is disclosed for providing a significantly better training set for use in training a neural network. The present invention is directed to providing further improvements in a method of this type.

Accordingly, a primary object of the present invention is to provide an improved method for increasing the accuracy of a training set for use in training an artificial neural network.

Another object of the present invention is to provide an improved method for increasing the accuracy of a training set for use in providing supervised training for a feed-forward neural network.

A further object of the present invention is to improve the performance of an AIS by providing an improved method for identifying and replacing inaccurate examples in the training set used for training the AIS.

In the particular preferred embodiment disclosed in my aforementioned patent application a method is disclosed comprising training an AIS using the entire training set, measuring the total generalization error of the trained system, successively determining the effect of each training pair on this total generalization error, and permanently removing from the training set those training pairs which are determined to increase the total generalization error. The resulting reduced training set then contains only those training pairs which, using this method, do not increase the total generalization error. In a preferred embodiment of the present invention, this method is improved by providing for testing training pairs for permanent removal in a "worst" training pair order, whereby a significantly more accurate resulting training set is obtained.

The specific nature of the invention as well as other objects, advantages and uses thereof will become evident from the following detailed description of a preferred embodiment of the invention in conjunction with the accompanying drawings.

DESCRIPTION OF THE PREFERRED EMBODIMENT

Most artificially intelligent systems (AIS) require a large set of examples for the training set in order to learn the correct responses over the problem domain. Just as when training a child, contradictory or incorrect training examples can lead to poor learning. Producing the training set is tedious; fatigue and boredom lead to human errors. Also, in "borderline" cases, a human may make a decision one way one time and the other way the next. In either case, the result is a corrupted training set from which it may not be able to train a neural network to perform with high accuracy. Attempts at human "quality control" reviews of the training set have not been successful. Reviewing thousands of examples has the same problems which produced the errors in the first case. Often this training set is inadvertently corrupted by incorrect examples, which can be a severe problem since performance is critically dependent upon the correctness of the training set. In the past there has been no accurate, systematic, theoretically sound method for evaluating these examples so as to permit the removal of those which will degrade performance.

In order to permit the present invention to be clearly understood, the previously presented prior art on neural networks will be considered in a more specific context. Note that many of the terms used below have already been presented in a more general way in the previously presented prior art description.

Intelligent decisions, whether produced by humans or machines, are the result of learned examples. For example, when a child sees a dog his parent says "dog". After being trained on many different dogs, the child says "dog" when one is seen, even though it may not be identical to any seen in the past; this is called "generalization"; that is, the ability to make correct decisions under similar but not identical circumstances. The education process is called "supervised training".

Equally important in decision making is "discrimination". A child trained only on dogs will say "dog" the first time a cat is seen. Thus the child must be trained on the full variety of animals likely to be encountered if he or she is to learn to discriminate among them.

Thus, supervised training requires a set of examples, conventionally called a training set. Each example in the training set has two parts: a set of characteristics and a target. In the case of the animal training set, the characteristics might be height, length, width, number of legs, color, and any others which will assist in the identification. The target would be the correct classification, e.g., dog, cat, pig etc. The set of characteristics are called an "input vector". The set of all possible animals would comprise a "target vector". An input vector, with its corresponding target vector will be called a "training pair". The training set is a collection of training pairs.

Once the training process is complete, one may visualize the AIS as a black box which inputs a set of characteristics (an input vector) and turns on one of a set of lights on its output. (The lights correspond to the target vector). Note that this on-off output is often replaced by continuous outputs, each of which represent the probability of an animal. Thus, one might visualize a box with a set of meters on its output, each of which indicates the probability that the current input vector represents its associated animal. The correct classification would then be determined by the meter with the largest (highest probability) indication.

As pointed out previously, artificial neural networks have been developed which can learn from a training set to produce correct output decisions. These may be implemented on digital or analog computers, either general or special purpose. The two most successful types of artificial neural networks are the multi-layer Perception (MLP) trained by backpropagation, and the previously described Generalized Regression Neural Network (GRNN). Both types use supervised training.

Next to be considered are the characteristics of a training set. For accurate generalization, the training set must be representative and consistent. To be representative, it must contain a range of examples which cover those to be classified; otherwise, errors can occur through over generalization. (The child calling its first cat a dog.)

For a training set to be consistent, all examples with similar input vectors must have similar output vectors. If, for example, very similar animals are sometimes classified as dogs and other times as cats, the result will be a confused child who does not learn well and makes errors.

Since artificially intelligent systems are frequently intended to replace humans, training sets are often produced by human observations. Producing the large sets required in many applications is tedious and the error rate may be high. Once an erroneous example is included in the training set, it may be very difficult to identify it. Human efforts often fail due to fatigue. Heretofore, no fully effective method has been available to allow a computer to accomplish this task.

Since the present invention is directed to an improvement of the method disclosed in my aforementioned patent application, a preferred implementation of the method disclosed in this aforementioned application will first be described.

Initially, an AIS is trained using the entire training set. It will be assumed that the AIS is a neural network. While various neural networks and training methods may be used, a Generalized Regression Neural Network (GRNN) as previously described herein is preferred because of the essentially zero training time required. It will be assumed that there are N training pairs in the training set and that the training pairs are numbered from 1 to N. The manner in which the method of the present invention is preferably applied for removing inaccurate training pairs is illustrated by the flow chart of FIG. 11.

Figure 11:
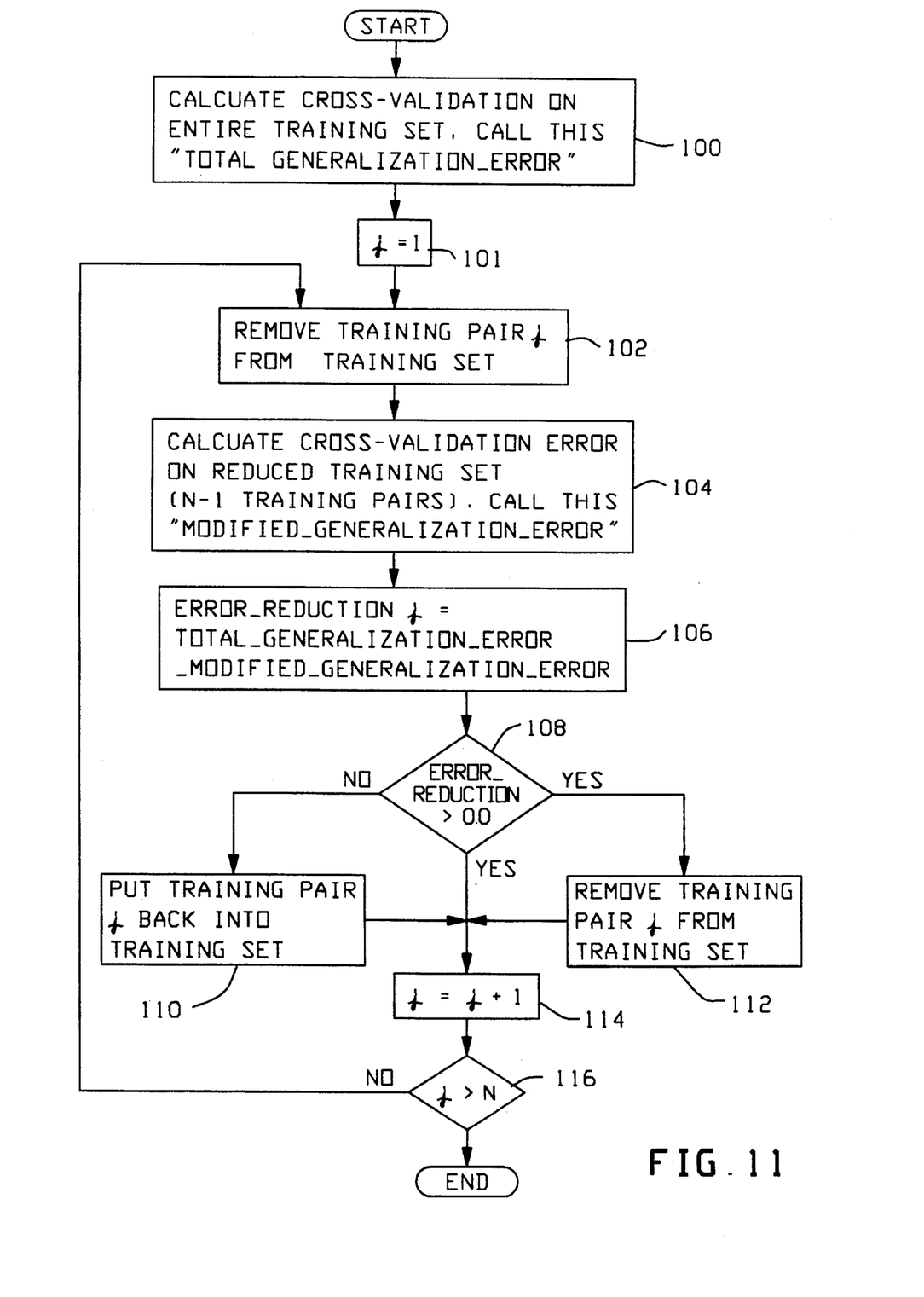
FIG. 11 is a flow chart illustrating the preferred method of removing inaccurate training pairs in a training set disclosed in my aforementioned patent application.

In block 100 in FIG. 11, a "TOTAL-GENERALIZATION-ERROR" is calculated for the trained AIS. This is preferably accomplished using cross-validation based on an exclude-one approach, which is a well known way of estimating the cross-validation error of a training set for an AIS. A preferred manner for accomplishing this cross-validation will be described hereinafter with reference to the flow chart of FIG. 12.

In block 102 in FIG. 11, a training pair j is removed from the training set. It is to be understood that j is an index for the training pairs and is initially set to 1 in block 101.

In block 104 in FIG. 11, a "MODIFIED_GENERALIZATION_ERROR" is calculated for the reduced training set (N–1), cross-validation again being used for this calculation as in block 100. Accordingly, block 104 may likewise use the cross-validation method exemplified in FIG. 12.

In block 106 in FIG. 11, an "ERROR_REDUCTION" is then calculated for the training pair j equal to the TOTAL_GENERALIZATION_ERROR minus the MODIFIED_GENERALIZATION_ERROR.

If decision block 108 in FIG. 11, finds that the ERROR_REDUCTION value for a training pair j is greater than zero, then the training pair j is put back into the training set (block 110). However, if decision block 108 finds that the ERROR_REDUCTION value is not greater than zero (block 112), then the training pair j is permanently removed from the training set (block 112), since its presence increases the TOTAL_GENERALIZATION_ERROR.

In block 114 in FIG. 11 the value of j is incremented by one and the new value of j is tested in decision block 116 to determine whether the last training pair N has been handled. If so, the flow ends; otherwise, the flow returns to block 102, and the FIG. 12 operations repeat for the next training pair.

It will be understood from the foregoing that when the FIG. 11 operations are completed for all N training pairs of a training set, each training pair which was found to increase the TOTAL_GENERALIZATION_ERROR will have been permanently removed from the training set. The training set will thus be optimal in that it contains only those training pairs which improve the generalization ability of the AIS. This optimal training set can be used for training a wide variety of other AIS networks, which will thereby be able to provide enhanced performance as a result of their being trained by a more accurate training set.

Figure 12:
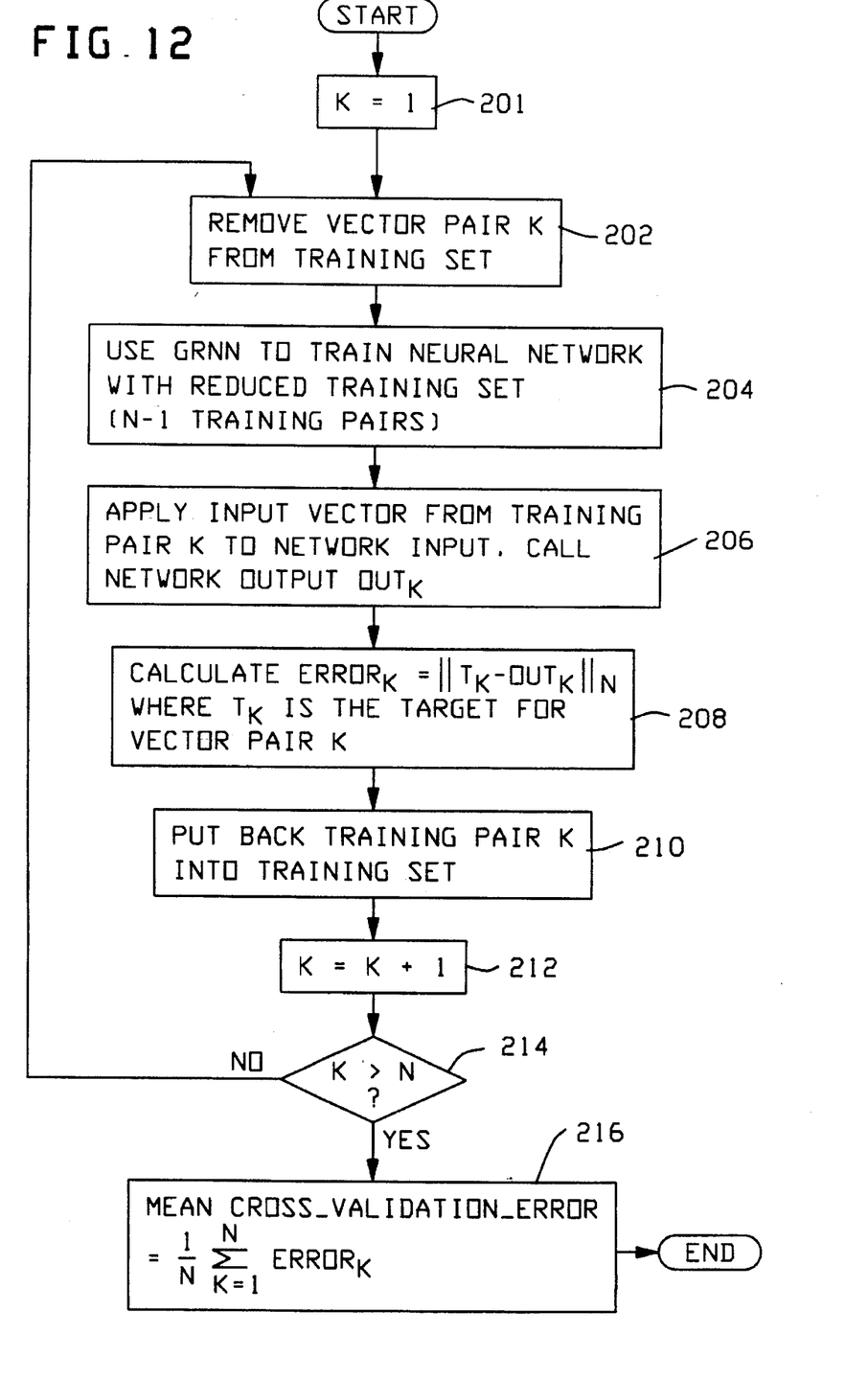
FIG. 12 is a flow chart illustrating a preferred method for determining cross-validation in blocks 100 and 104 in FIG. 11.

Next to be considered with reference to the flow chart of FIG. 12 is a particularly advantageous manner for calculating the cross-validation performed in blocks 100 and 104 in FIG. 11. As before, the training pairs making up the training set may be considered to be numbered from 1 to N, where N is the number of training pairs, and "k" is an index (similar to j in FIG. 11). Block 201 in FIG. 12 sets k=1.

In block 202 in FIG. 12, training pair k is removed from the training set. In block 204, the AIS is trained with the reduced training set (i.e., with training pair k removed). Again, GRNN is preferably used for training because of the zero training time. With GRNN, training consists simply of loading the training set into an appropriately programmed computer.

In block 206 in FIG. 12, the removed training pair k is applied as an input to the AIS, producing $OUT_k$ from the AIS. In block 208, $OUT_k$ is used to calculate the relative error $ERROR_k = \|T_k - OUT_k\|_N$, where $T_k$ is the target for training pair k. In general, $T_k$ and $OUT_k$ are both vectors $\|\cdot\|_n$ indicates the $L_N$ norm of their vector difference.
Where:

$$\|V\|_N = \left( \sum_{i=1}^{k} |v_i|^N \right)^{1/N}$$

and k=number of components in vector v.

For example, suppose that each vector has three components:

$$T_k = [t_1, t_2, t_3]$$

$$OUT_k = [O_1, O_2, O_3]$$

There vector difference is then:

$$V = [t_1 - O_1, t_2 - O_2, t_3 - O_3]$$

$$\|V\|_1 = |T_1 - O_1| + |t_2 - O_2| + |T_3 - O_3|$$

(the CITY block No.)

$$\|V\|_2 = (|t_1 - O_1|^2 + |t_2 - O_2|^2 + |t_3 - O_3|^2)^{1/2}$$

(the Euclidian norm)

The choice of N depends upon the problem. Large N emphasizes large differences.

In block 210 in FIG. 12, the removed training pair is returned to the training set. The value of k is then incremented by 1 (block 112). The resulting k+1 value is tested (block 214) to determine whether it exceeds N (indicating that the last training pair N of the training set has been handled). If not, the flow cycles back to block 202 where the next (k+1) training pair is removed from the training set and the previously described operations in blocks 204, 206, 20-8, 210, 212 and 214 repeated. When block 214 indicates that the last training pair N has been removed and its corresponding $ERROR_N$ value determined, the flow proceeds to block 216.

In block 216, the absolute sums of the $ERROR_k$ values obtained for the training pairs 1 to N are summed to produce the mean $$\text{CROSS\_VALIDATION\_ERROR} = \frac{1}{N} \sum_{k=1}^{N} ERROR_k,$$

which is used for calculating the TOTAL\_GENERALIZATION\_ERROR and MODIFIED\_GENERALIZATION\_ERROR, in blocks 100 and 104, respectively in FIG. 11. Alternatively, $$\frac{1}{N} \sum_{k=1}^{N} (ERROR_K)^2$$

could also be used.

It will be evident from the foregoing description of the preferred method disclosed in the aforementioned application in connection with FIGS. 11 and 12 that the method typically requires that a relatively large number of trainings be performed with different training sets (for example, in performing the cross-validation error calculations in block 104 of FIG. 11 using the method of FIG. 12). Since GRNN is used for these trainings, they can be performed in a reasonable amount of time because of the essentially zero training time required by GRNN.

Figure 13:
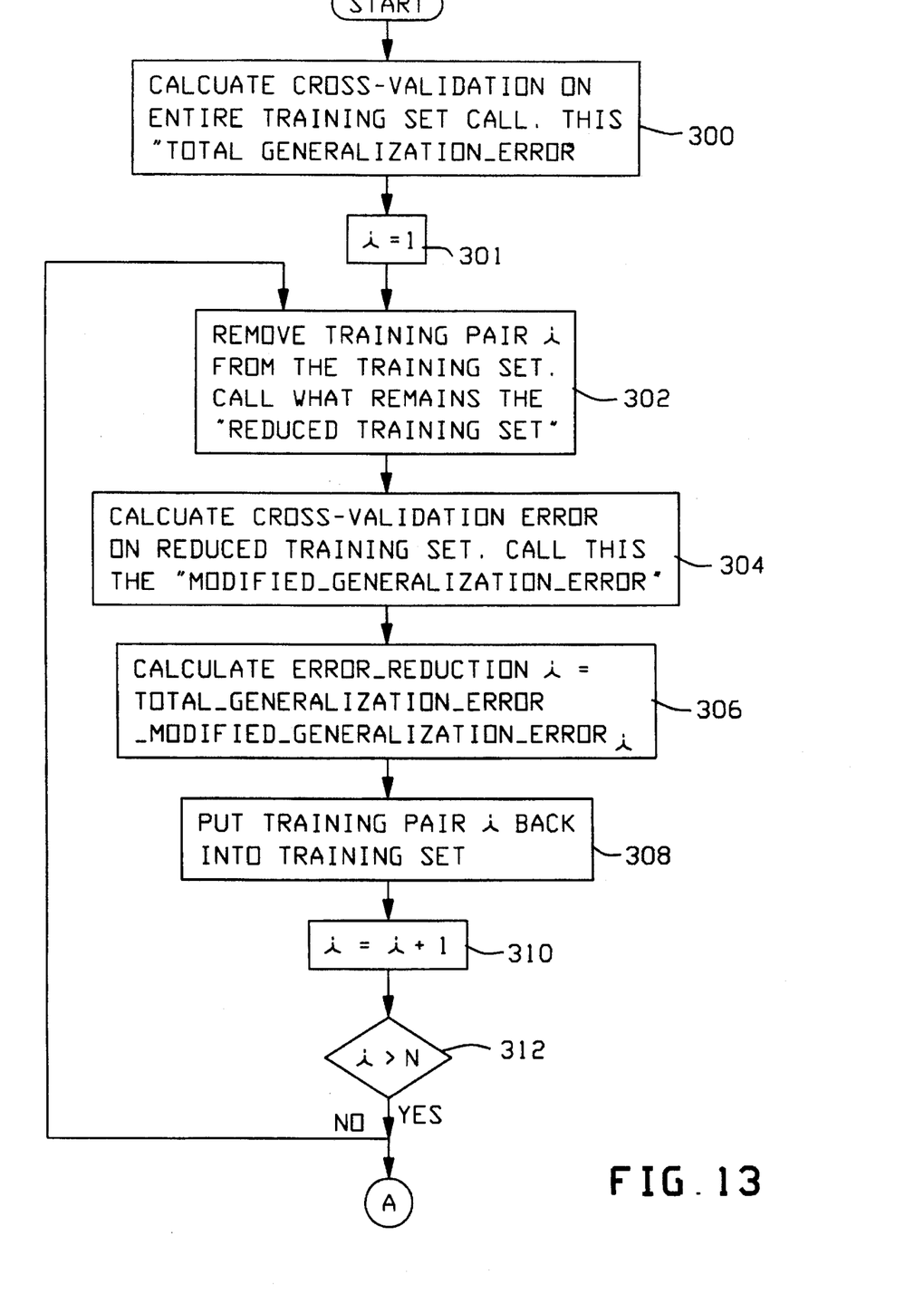
FIGS. 13 and 14 are flow charts illustrating a preferred implementation of the improved method of the present invention for removing inaccurate training pairs in a training set.
Figure 14:
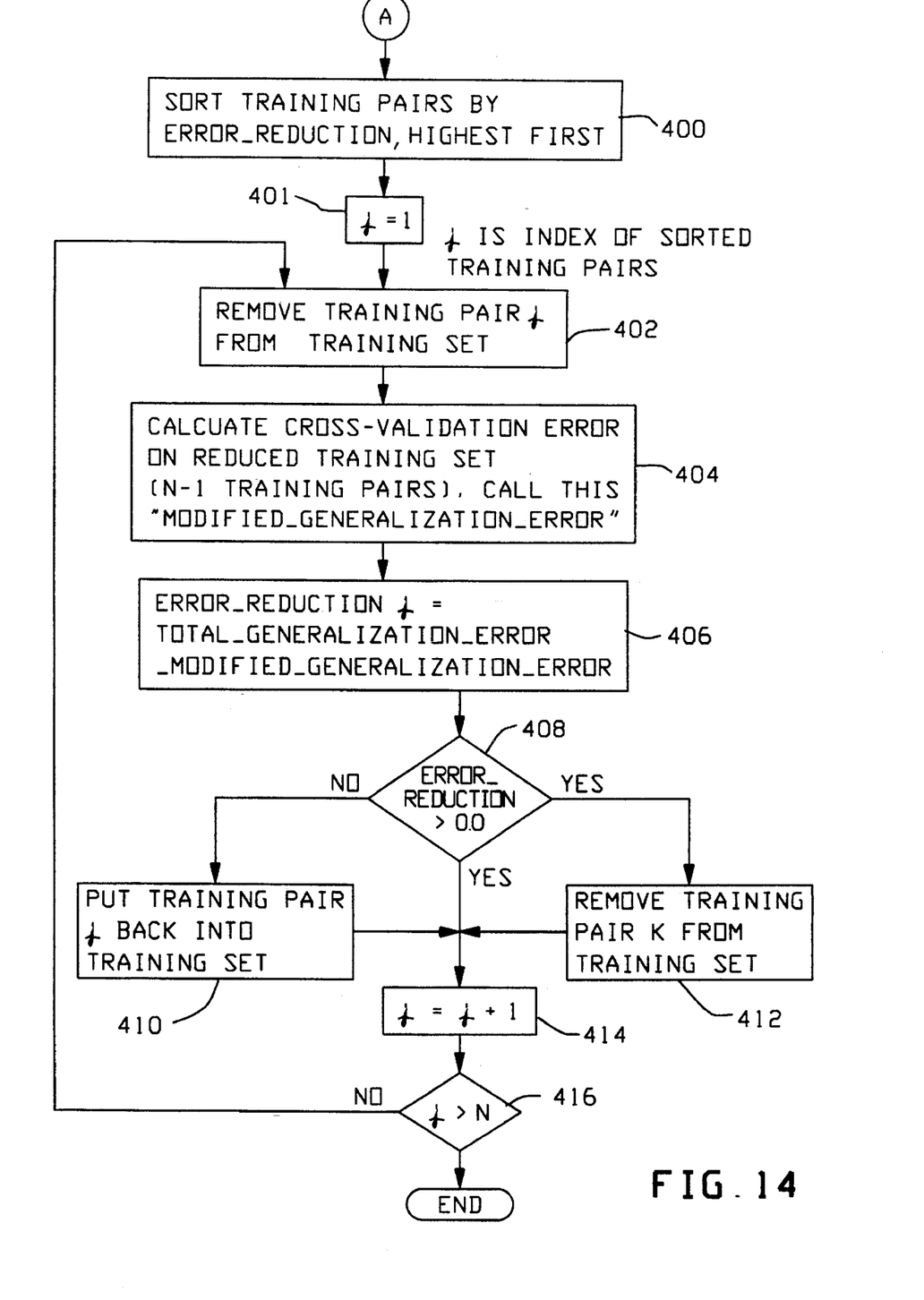

As explained in my aforementioned application, the above described method illustrated in FIGS. 11 and 12 results in a highly accurate training set for training a neural network. It has been discovered that the particular training pairs which will constitute the resulting training set and the total generalization error obtained therefor is affected by the order in which the training pairs are tested for permanent removal. It has also been discovered that a particularly advantageous order for testing training pairs for permanent removal is one which tests the worst (least accurate) training pairs first, since this worst-removal order appears to produce the lowest total generalization error for the resulting training set. FIGS. 13 and 14 are flow charts illustrating a preferred method which incorporates this worst removal order for testing the training pairs for permanent removal in accordance with the present invention.

Referring first to FIG. 13, note that the operations indicated in blocks 300,301,302, 304 and 306 respectively correspond to those in blocks 100,101, 102, 104 and 106 in FIG. 11. These initial steps are the same as in the method disclosed in my aforementioned application and described herein in connection with FIGS. 11 and 12.

It will be remembered that the method of the aforementioned application (FIG. 11) permanently removes a training pair from the training set if removal of the training pair produces a higher total generalization error for the reduced training set; if not, the removed training pair is put back into the training set.

In the preferred embodiment of the improved method of the present invention, a removed training pair is always put back into the training set (block 308) after its corresponding ERROR\_REDUCTION value has been determined (block 306) and before the next training pair is acted on as a result of the repeating operations produced by blocks 310 and 312 (similarly to the repeating produced by blocks 114 and 116 in FIG. 11). Accordingly, when "A" is reached in FIG. 13, an ERROR\_REDUCTION value will have been determined for each training pair in the training set. These ERROR\_REDUCTION values are different from those obtained using the method of my aforementioned application (FIG. 11), since each ERROR\_REDUCTION value is obtained using a training set having only the corresponding training pair removed from the entire training set. On the other hand, in the method of my aforementioned application (FIG. 11) a training set is permanently removed if it is determined to produce a greater error before the next training pair is tested.

After "A" is reached in FIG. 13, operation continues as shown in FIG. 14.

As indicated by block 400 in FIG. 14, the training pairs are sorted based on their ERROR\_REDUCTION values (obtained in accordance with FIG. 13), beginning with the training pair which was determined to produce the highest error. Following this sorting in block 400, blocks 401,402, 404,406,408,410,412,414 and 416 are performed which perform the same operations as blocks 101, 102, 104, 106, 108, 110, 112, 114 and 116, respectively, in FIG. 13. Note that an the important difference between the method of the present invention illustrated in FIGS. 13 and 14, and the method disclosed in my aforementioned application (FIG. 11) is that, in the present invention, training pairs are successively tested for error and permanent removal in the sorted order produced by block 400.

It has been found that the alternate method of the present invention described with respect to the preferred implementation illustrated in FIGS. 13 and 14 can provide a significantly more accurate training set having a lower overall total generalization error, thereby providing for enhanced performance of the neural network to be used therewith.

It is to be understood that the preferred methods described herein can be implemented in various ways by those skilled in the art using software running on general purpose computers and/or by using dedicated neural network hardware. For example, presently available computing systems providing massive parallel computing may readily be employed for this purpose, such as systems provided by Intel and Adaptive Solutions. In particular, the Adaptive Solutions system is designed around their CNAPS integrated circuit. This circuit contains 64 processors in an architecture capable of emulating all known neural network paradigms. Its throughput in the feed-forward configuration is 1.6 billion connections per second, and does 250 million connection updates per second in the backpropagation mode. The development system operates as a server on an Ethernet, and is compatible with several workstations. The system can be supplied with up to 512 processors (four chips) that yield a peak performance of 7.68 0billion multiply-accumulate operations per second.

Although the present invention has been exemplified with respect to particular preferred implementations, it is to be understood that many modifications and variations in implementation and use possible within the scope of the invention to which applicant is entitled. Accordingly, the present invention is to be considered as including all modifications and variations of the invention encompassed by the appended claims.

What is claimed is:

1. A method for optimizing a training set comprised of a large plurality of training pairs for use in training a neural network, said method comprising the steps of:

a) training a neural network using said training set;

b) measuring a generalization error of the trained neural network;

c) removing a training pair from the training set to produce a reduced training set;

d) training the neural network using the reduced training set;

e) measuring the generalization error of the trained reduced training set;

f) reinserting the removed training pair into the training set;

g) performing steps c), d), e), and f) above for each training pair in the training set;

h) sorting the training pairs based on their measured generalization error; and i) performing steps c), d), e) and f) above for each training pair in the training set, except that said reinserting in step f) is not performed when the measured generalization error in step e) is less than that obtained before removal of the training pair.

2. The method of claim 1, wherein the step (a) employs a supervised training approach.

3. The method of claim 1, wherein a training pair comprises an input vector and a target vector, said input vector comprising a set of input characteristics and said target vector corresponding to a particular set of input characteristics.

4. The method of claim 3, wherein each target vector provides an output indicating the probability of correspondence to an input vector.

5. The method of claim 1, wherein training sets are produced based on human observations.

6. The method of claim 1, wherein a generalized regression neural network is used for the training steps.

7. The method of claim 1, wherein the steps of measuring a generalization error are accomplished using cross-validation based on an exclude one approach.

8. The method of claim 1, wherein measuring a generalization error is performed using the following steps:

(aa) removing a training pair from the training set whose generalization error is being measured, a training pair comprising an input vector $I_k$ and a target vector $T_k$;

(bb) training the neural network using the reduced training set obtained after removing training pair k;

(cc) applying the input vector $I_k$ to the neural network for producing an output $O_k$ corresponding thereto;

(dd) calculating an $Error_k = \|T_k - Out_k\|$ for the removed training pair k;

(ee) returning the training pair k to the training set;

(ff) performing steps (aa), (bb), (cc), (dd) and (ee) above for each of the other training pairs in the training set whose generalization error is being measured to obtain a corresponding $Error_k$ value; and (gg) summing the $Error_k$ values to calculate the generalization error for the training set whose generalization error is being measured.

9. The method of claim 8, wherein a generalized regression neural network is used for the step of training the neural network.

* * * * *